F. T. SKUSE.
POULTRY FEED APPARATUS.
APPLICATION FILED FEB. 18, 1921.
1,400,833.
Patented Dec. 20, 1921.
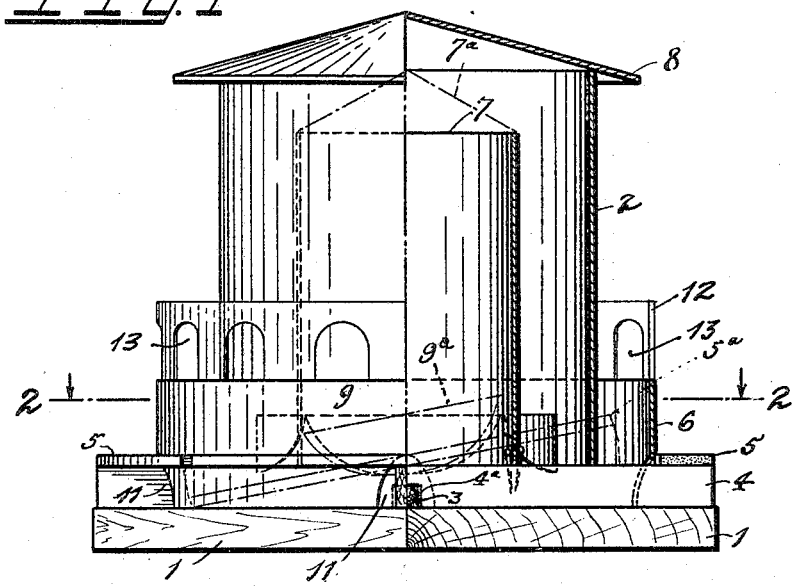
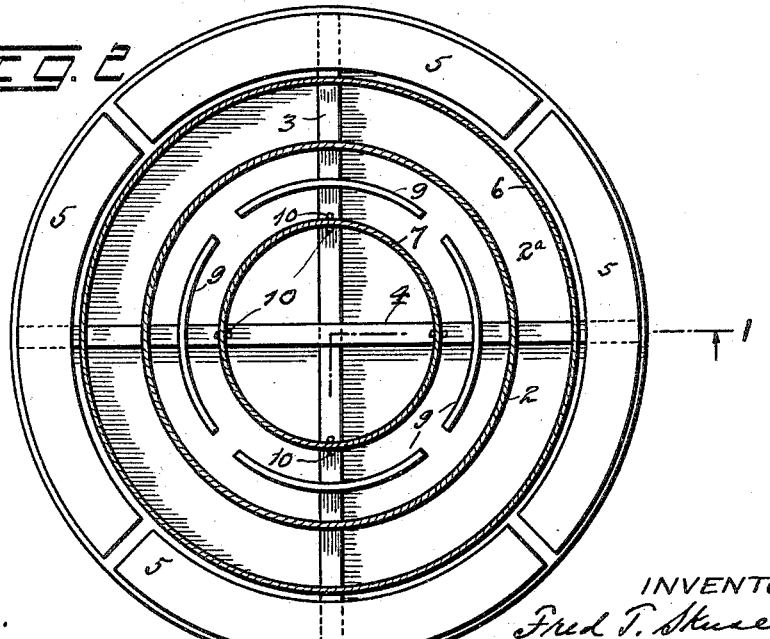
INVENTOR
Fred T. Skuse,
By Mason, Fenwick & Lawrence
ATTORNEYS

UNITED STATES PATENT OFFICE.

FRED T. SKUSE, OF KIRKLAND, WASHINGTON.

POULTRY-FEED APPARATUS.

1,400,833.  Specification of Letters Patent.  Patented Dec. 20, 1921.

Application filed February 18, 1921. Serial No. 446,078.

*To all whom it may concern:*

Be it known that I, FRED T. SKUSE, a citizen of the United States, residing at Kirkland, in the county of King and State of Washington, have invented certain new and useful Improvements in Poultry-Feed Apparatus; and I do hereby declare the following to be a full, clear, and exact description of the invention, such as will enable others skilled in the art to which it appertains to make and use the same.

This invention relates to feed boxes or feed racks for poultry, and particularly to a device of this character having a reservoir for feed adapted to be delivered little by little, whereby the poultry may have constantly before them a sufficient supply of feed but be prevented from wasting and fouling it.

It is an object of this invention to enable fowls themselves when they reach feeding position to cause the material stored in the reservoir to be released into the feed spaces a little at a time; and the invention consists, in general, in a feed reservoir, and an exterior feed space or trough, with means whereby the weight of the fowls, when they have reached the feed position, operates means for releasing the feed from the reservoir into the feed space or trough.

The construction and arrangement of said means is such that fowl will be prevented from stepping into the feed trough and thus defiling the food while eating a part of it. They will also be prevented from packing soft feed, such as bran and mashes, by treading on such feed.

In the accompanying drawings:

Figure 1 is a view of the feeding apparatus showing one half in elevation and the other half in vertical section on the line 1—1 of Fig. 2;

Fig. 2 is a horizontal section on the line 2—2 of Fig. 1.

In said drawings like reference characters indicate like parts in each of the views.

In the embodiment illustrated the apparatus is provided with a suitable block or table 1, which may constitute its base. The said base, however, may be supported on a central pivot (not shown) so that the apparatus may readily revolve, or it may be suspended as a whole from a point above by a wire or cord (not shown) in order that, due to the activities of the fowl the feed trough may be kept cleaned out uniformly.

A shell 2, preferably of cylindrical form and formed of sheet metal, constitutes a storage reservoir for the feed. The said shell 2 is provided with a suitable top 8, which may be lifted to permit the reservoir to be filled with feed.

Mounted loosely on the base 1 are two cross bars, preferably of wood, 3 and 4, the upper surfaces of which are preferably flat, as shown. The said two cross bars 3 and 4 are notched or halved together loosely, as indicated at $4^a$, so that each of the said bars 3 and 4 may rock with respect to the other. Bars of a cross sectional dimension of one by two inches are suitable for the purpose; said bars rest edgewise upon the base 1. The reservoir 2 rests loosely upon the top of the said bars 3 and 4.

Also mounted loosely upon the bars 3 and 4, by preference, is an inner or core cylinder 7, which may have, if desired, a conical top, $7^a$, so that the feed, inserted after removal of the cover 8, will fall down between the sides of the core cylinder 7 and the wall of the reservoir 2. The bottom of the said cylinder 7 rests between pins 10 inserted in the upper edges of the cross bars 3 and 4 so as to retain the cylinder 7 in central position on said bars 3 and 4 but still permit said strips to rock. It will be obvious that similar pins 10 may be inserted in bars 3 and 4 to similarly locate the shell 2.

Secured to each end of said bars 3 and 4 is a segmental platform 5, each platform being secured to the upper edge of a strip midway between its ends.

Between the platforms 5 and the shell 2 is an annular wall 6 resting firmly on the base 1 and having notches in its sides, as shown at 11, through which the bars 3 and 4 extend, said notches being large enough to permit said bars to rock. Also secured to the bars 3 and 4 are agitator members 9 located between the walls of the core cylinder 7 and shell 2. Extending upward from the wall 6 is, preferably, a guard wall 12 having suitable openings 13 through which the fowl may pass their heads in order to reach the food deposited in the trough or feeding space between the wall 6 and the reservoir 2. The said guard 12 prevents the fowls from getting into said feed space or trough.

From the foregoing description it will be seen that the depression of one end of a platform 5 to the position indicated at $5^a$ will rock the bar to which it is attached until one end of the platform strikes against the base 1. Tilting of a platform 5 therefore rocks the bars, 3 and 4, and slightly elevates the shell 2 and the core cylinder 7, thus slightly agitating the contents of the reservoir and slightly lifting the shell so as to permit a little more feed to pass out under the lower edge of said shell 2 into the feed space between the wall 6 and the wall of said shell within reach of the fowl. The rocking of said platforms 5 also moves the agitators 9 a considerable extent as indicated at 9ª in Fig. 1, thus preventing the feed from packing within the reservoir and causing it to flow downward more freely.

By the described construction, when the fowls approach the feed box and jump on the platforms 5, in order to get at the feed, the platforms will be depressed at one end or the other and the described operation will take place, which will cause a sufficient amount of feed to flow out under the wall of the cylinder 2 where it may be reached by the fowls. The fowls cannot get into the feed trough, and the feed will therefore remain in a clean and loose or unpacked condition.

Having described my invention in such manner as to enable those skilled in the art to which it appertains to make and use the same, what I claim and desire to secure by Letters Patent is:

1. A base, tiltable members mounted on the base, platforms secured to said tiltable members whereby depression of the platforms will cause said members to tilt, and a reservoir having an open lower end resting upon said tiltable members and adapted to be elevated by the tilting of said members.

2. The combination of a base, tiltable cross bars resting on the base, a reservoir having an open lower end resting on said cross bars and adapted to be raised or lowered by the tilting of said bars, and a platform secured at its central portion to the end of each tiltable member.

3. The combination of a base, cross bars having flat upper surfaces resting on the base, a reservoir having an open lower end having its lower edge resting on said cross bars, a core member within said reservoir resting on said cross bars, and a tiltable platform secured by its middle to the end of each of said bars.

4. The combination of a base, tiltable cross bars resting on said base, said cross bars having flat upper surfaces, a reservoir having an open lower end having its lower edge resting on said cross bars, a core member resting on said cross bars, agitators secured to said cross bars between said core member and the wall of said reservoir, and a tiltable platform secured by its middle to the outer end of each cross bar.

5. The combination of a base, tiltable cross bars resting on said base, a reservoir having an open lower end having its lower edge resting on said tiltable cross bars, a wall surrounding and spaced from said reservoir and secured to said base, said wall having openings through which said cross bars project to permit them to tilt, and platforms secured to the ends of said cross bars outside of said walls, said platforms being adapted to tilt said cross bars.

6. The combination of a base, a shell having an open lower end disposed above the base, a tiltable cross bar above the base, a core concentric with said shell constructed and arranged to be agitated by the cross bar, and a tiltable member on the cross bar outside of said shell adapted to receive the weight of a fowl approaching to feed, the tiltable movement of the cross bar effected by the fowl causing movement of the core to assist in the discharge of the feed.

7. In a device of the character described, a rockable cross bar, a reservoir resting on said cross bar, said reservoir being adapted to be slightly elevated by the rocking of the cross bar, and a platform secured on the cross bar, exteriorly of the reservoir, adapted to receive the weight of a fowl to rock the cross bar.

In testimony whereof I affix my signature.

FRED T. SKUSE.